US008122585B2

(12) United States Patent
Chiasson et al.

(10) Patent No.: US 8,122,585 B2
(45) Date of Patent: Feb. 28, 2012

(54) SPANNER PLATE

(75) Inventors: Mark A Chiasson, Merrimack, NH (US); Thomas R Faucher, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 1062 days.

(21) Appl. No.: 12/023,642

(22) Filed: Jan. 31, 2008

(65) Prior Publication Data

US 2008/0196473 A1 Aug. 21, 2008

Related U.S. Application Data

(60) Provisional application No. 60/902,550, filed on Feb. 20, 2007.

(51) Int. Cl.

| | |
|---|---|
| ***B23P 17/04*** | (2006.01) |
| ***B23P 19/00*** | (2006.01) |
| ***B21F 15/00*** | (2006.01) |
| ***B25B 7/12*** | (2006.01) |

(52) U.S. Cl. ............ 29/592; 29/729; 72/409.06; 81/342

(58) Field of Classification Search ............... 29/525.01, 29/592, 428, 592.1, 729, 736, 750, 758, 761, 29/721; 72/409.06, 409.14, 409.13; 81/342, 81/424.5

See application file for complete search history.

(56) References Cited

U.S. PATENT DOCUMENTS

| | | | | |
|---|---|---|---|---|
| 2,388,462 | A | 11/1945 | Beeh | 103/173 |
| 2,444,550 | A | 7/1948 | Ashton | 103/223 |
| 2,737,168 | A | 3/1956 | Chandler | 123/140 |
| 4,236,878 | A | 12/1980 | Terauchi | 417/269 |
| 4,240,280 | A | 12/1980 | Foslien | 72/410 |
| 4,667,502 | A | 5/1987 | Bush et al. | 72/453.16 |
| RE33,714 | E | 10/1991 | Anderson et al. | |
| 5,195,042 | A | 3/1993 | Ferraro et al. | 364/468 |
| 5,437,177 | A | 8/1995 | Orcutt et al. | 72/402 |
| 5,472,322 | A | 12/1995 | Huet et al. | 417/415 |
| 5,727,417 | A | 3/1998 | Moffatt et al. | 72/453.03 |
| 5,789,038 | A | 8/1998 | Ono | 427/437 |
| 6,162,024 | A | 12/2000 | Bruzek | 417/222.1 |
| 6,264,437 | B1 | 7/2001 | Porel | 417/390 |
| 6,446,482 | B1 | 9/2002 | Heskey et al. | 72/453.16 |
| 6,453,719 | B1 | 9/2002 | Heskey et al. | 72/453.16 |
| 6,564,610 | B2 | 5/2003 | Lefavour et al. | 72/453.16 |
| 7,325,438 | B2 * | 2/2008 | Heggemann et al. | 72/409.14 |
| 2004/0200060 | A1 | 10/2004 | Shutts et al. | 29/751 |
| 2005/0000266 | A1 | 1/2005 | Hetland et al. | 72/409.06 |
| 2006/0156786 | A1 | 7/2006 | Lefavour et al. | 72/453.16 |
| 2006/0213248 | A1 | 9/2006 | Cleland et al. | 72/409.01 |

OTHER PUBLICATIONS

Burndy Products Catalog (2 pages).
U.S. Appl. No. 11/429,039, filed May 2006, Montminy et al.

* cited by examiner

*Primary Examiner* — John C Hong
(74) *Attorney, Agent, or Firm* — Harrington & Smith

(57) ABSTRACT

Disclosed herein is an electrical connector tool spanner plate. The electrical connector tool spanner plate includes a first section and a second section. The first section includes an aperture and a first opening. The aperture extends along a majority of a length of the first section. The spanner plate is configured to surround an electrical connector tool cam mechanism at the aperture. The second section includes a second opening. The second section extends from the first section in a general cantilevered fashion. The second opening is proximate a free end of the second section. The aperture is between the first opening and the second opening.

24 Claims, 4 Drawing Sheets

SPANNER PLATE

CROSS REFERENCE TO RELATED APPLICATION

This application claims priority under 35 U.S.C. §119(e) to U.S. provisional patent application No. 60/902,550 filed Feb. 20, 2007 which is hereby incorporated by reference in its entirety.

BACKGROUND OF THE INVENTION

1. Field of the Invention

The present invention relates to an electrical connector tool and, more particularly, to a spanner plate for an electrical connector tool.

2. Brief Description of Prior Developments

Electrical connector tools having audible and tactile features are known in the art. For example U.S. Provisional Patent Application No. 60/851,724, filed on Oct. 13, 2006, discloses audible (such as a "pop" for example) and tactile (such as a vibratory effect for example) features utilized with a hydraulic crimping tool wherein the audible and tactile features are actuated when a predetermined hydraulic pressure is met. Additionally, U.S. Pat. Nos. 6,564,610 and Re. 33,714 disclose electrical connector tools having various audible and tactile features. There is a problem with conventional audible and tactile features in that these indications may not be sufficiently loud (or tactile) in various environments and the user may not realize that the desired crimping force was achieved. As customers demand dependable tools that are easy to operate in various working environments, there is a need to provide audible and tactile indicating features having robust and reliable configurations. It is, therefore, desirable to provide an improved configuration which indicates to the user that a completed crimping operation has been performed.

SUMMARY OF THE INVENTION

In accordance with one aspect of the invention, an electrical connector tool spanner plate is disclosed. The electrical connector tool spanner plate includes a first section and a second section. The first section includes an aperture and a first opening. The aperture extends along a majority of a length of the first section. The spanner plate is configured to surround an electrical connector tool cam mechanism at the aperture. The second section includes a second opening. The second section extends from the first section in a general cantilevered fashion. The second opening is proximate a free end of the second section. The aperture is between the first opening and the second opening.

In accordance with another aspect of the invention, an electrical connector tool is disclosed. The electrical connector tool includes a frame, a jaw, a first handle, a spanner plate, a cam member, and a resilient member. The frame includes a first end and a second end. The jaw is connected to the first end of the frame. The first handle extends from the second end of the frame. The spanner plate includes a first end and a second end. The first end is connected to the jaw. The spanner plate is configured to transfer a force between the first handle and the jaw. The cam member is between the first end and the second end of the spanner plate. The cam member is supported within the frame. The resilient member is connected between the first handle and the second end of the spanner plate.

In accordance with another aspect of the invention, a method of manufacturing an electrical connector tool is disclosed. A frame comprising a first end and a second end is provided. The frame includes a first handle extending from the second end of the frame. A jaw is movably connected to the first end of the frame. A spanner plate is supported within the frame. The spanner plate includes a first end and a second end. The first end is connected to the jaw. The spanner plate is configured to transfer a force between the first handle and the jaw. A cam member is connected to the frame. The cam member is between the first end and the second end of the spanner plate. A resilient member is connected between the first handle and the second end of the spanner plate.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
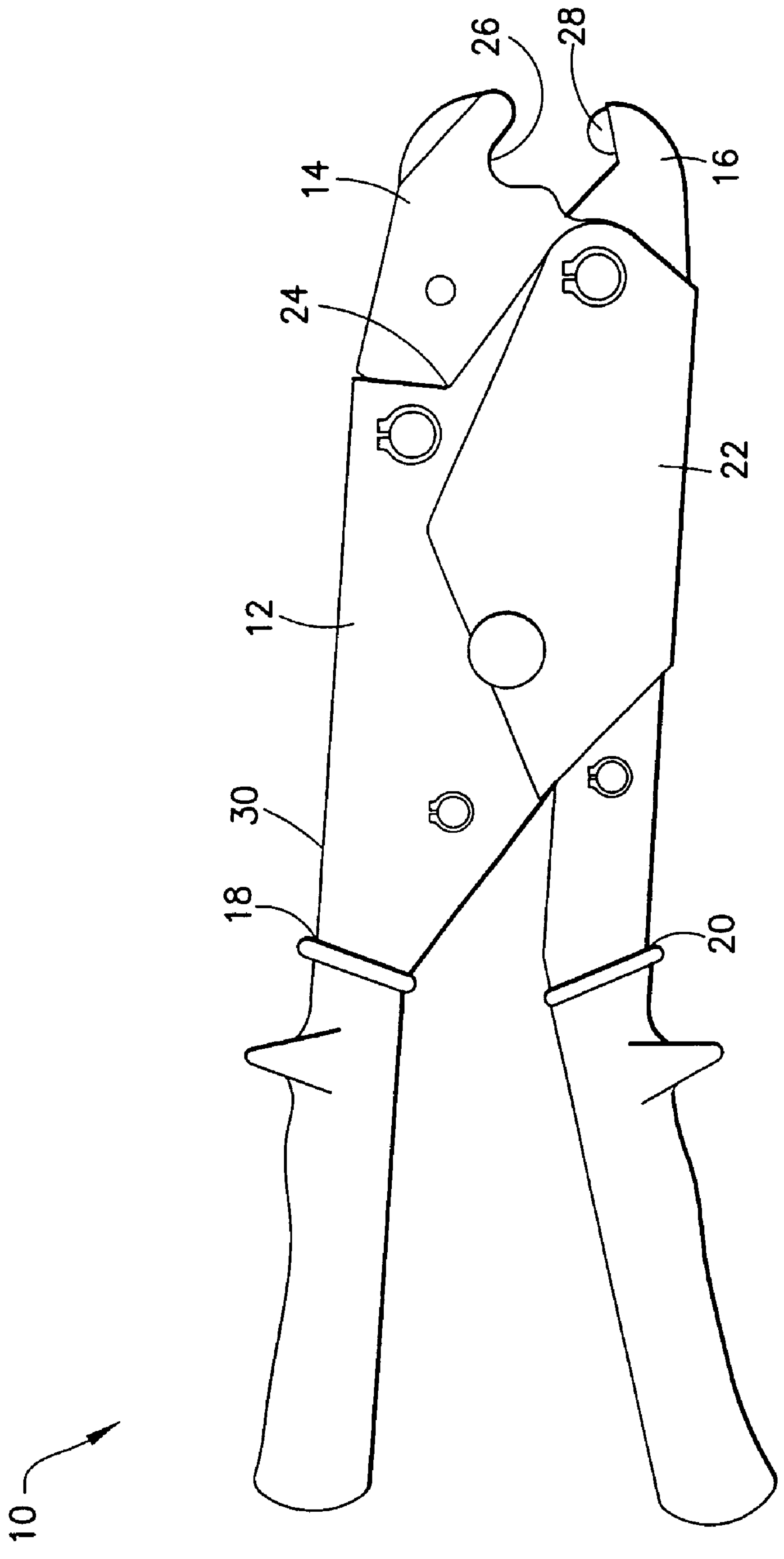
FIG. 1 is a side elevational view of a crimping connector incorporating features of the present invention.

Referring to FIG. 1, there is shown a side elevational view of a crimping tool 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

The crimping tool 10 includes a frame 12, a first jaw 14, a second jaw 16, a first handle 18, a second handle 20, and a housing 22. The jaws 14, 16 are pivotally connected to each other and are attached to a first end 24 of the frame 12. The first jaw 14 comprises a groove 26. The second jaw 16 comprises an indentor 28. The first handle 18 extends from a second end 30 of the frame 12. The second handle 20 is pivotably attached to the frame 12. The housing 22 extends between the second jaw 16 and the second handle 20. The crimping tool 10 is configured to crimp an electrical connector (not shown) between the jaws 14, 16 upon manipulation of the handles 18, 20. Additionally, the disclosed crimping tool 10 provides an audible and tactile indication subsequent to the crimping operation.

It should be understood that although the first jaw 14 and the second jaw 16 terminate in the groove 26 and the indentor 28, respectively, the first jaw 14 and the second jaw 16 may comprise reverse configurations wherein the first jaw terminates in an indentor and the second jaw terminates in a groove. Additionally, it should be noted that alternate embodiments may comprise any type of compression or forming jaws including removable crimps or cutting dies.

Figure 2:
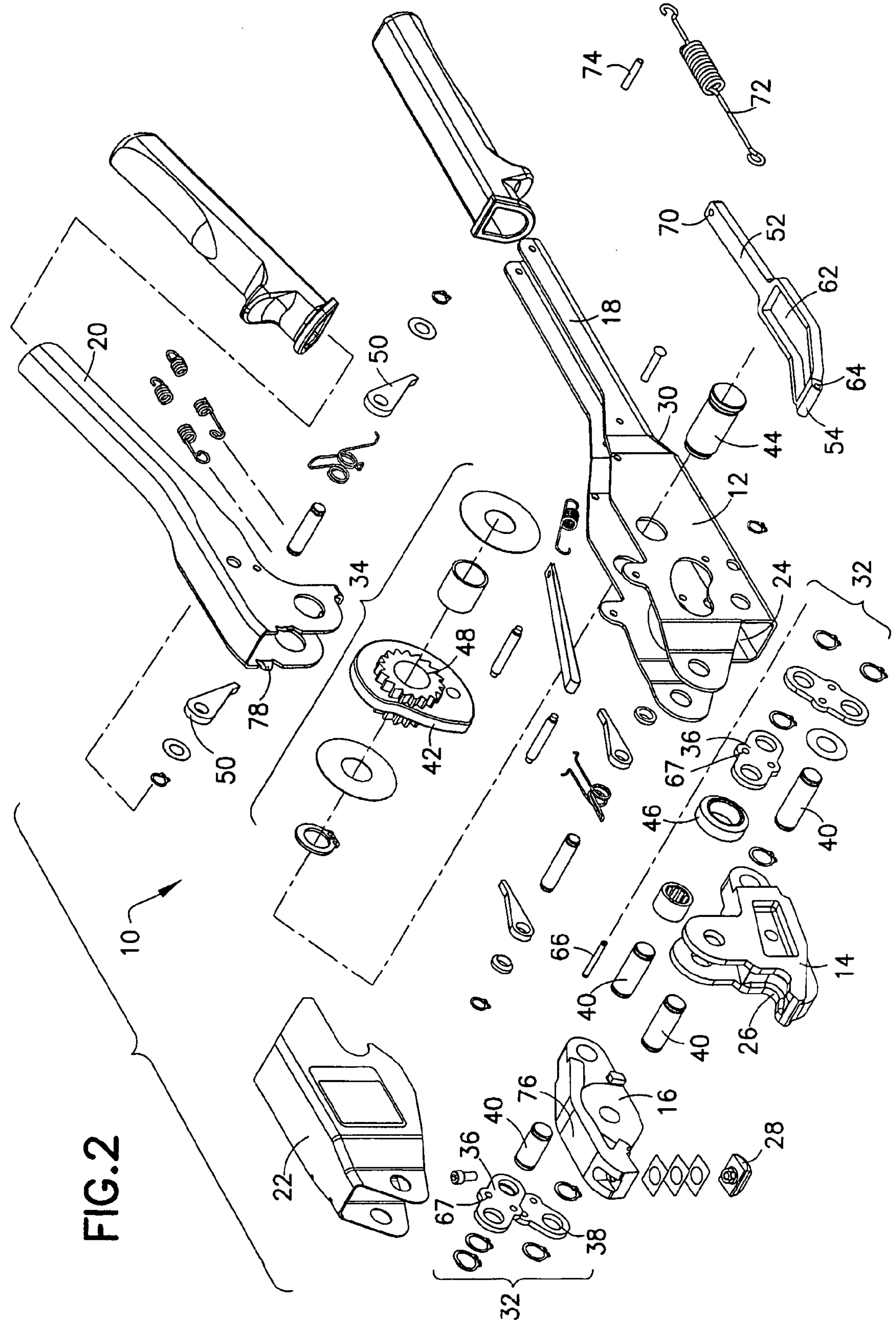
FIG. 2 is an exploded perspective view of the crimping connector shown in FIG. 1.
Figure 3:
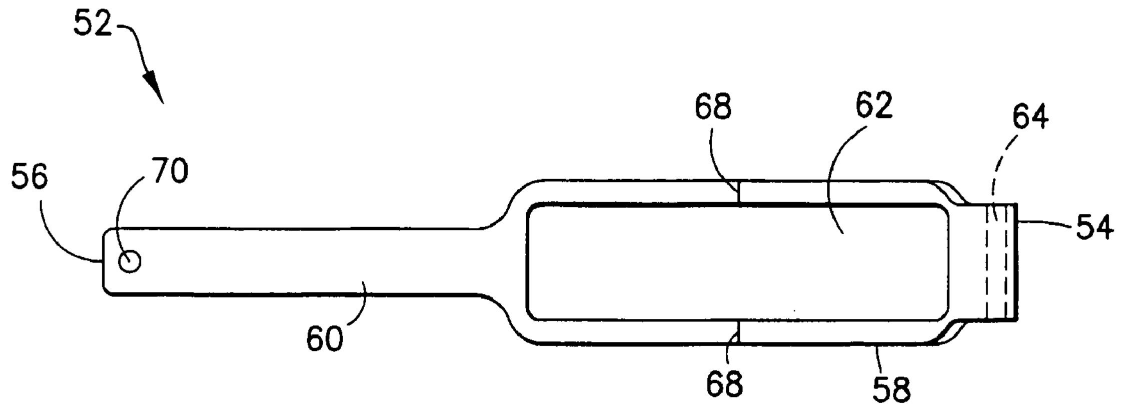
FIG. 3 is a top plan view of a spanner plate used in the crimping connector shown in FIG. 1.
Figure 4:
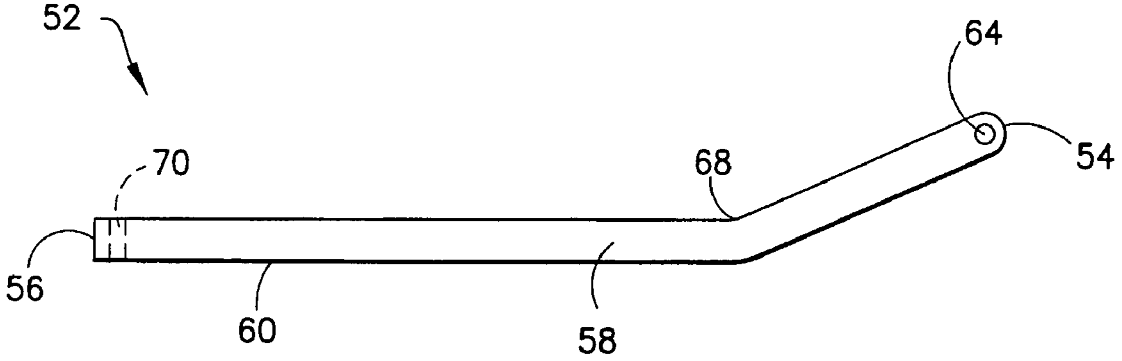
FIG. 4 is a side elevational view of the spanner plate shown in FIG. 3.
Figure 5:
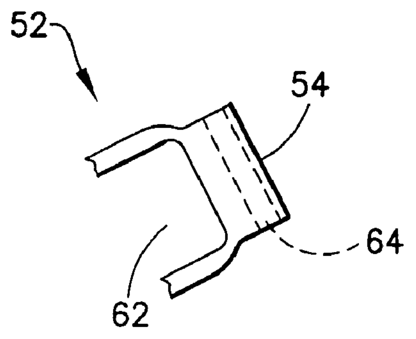
FIG. 5 is a partial enlarged view of the spanner plate shown in FIG. 3.
Figure 6:
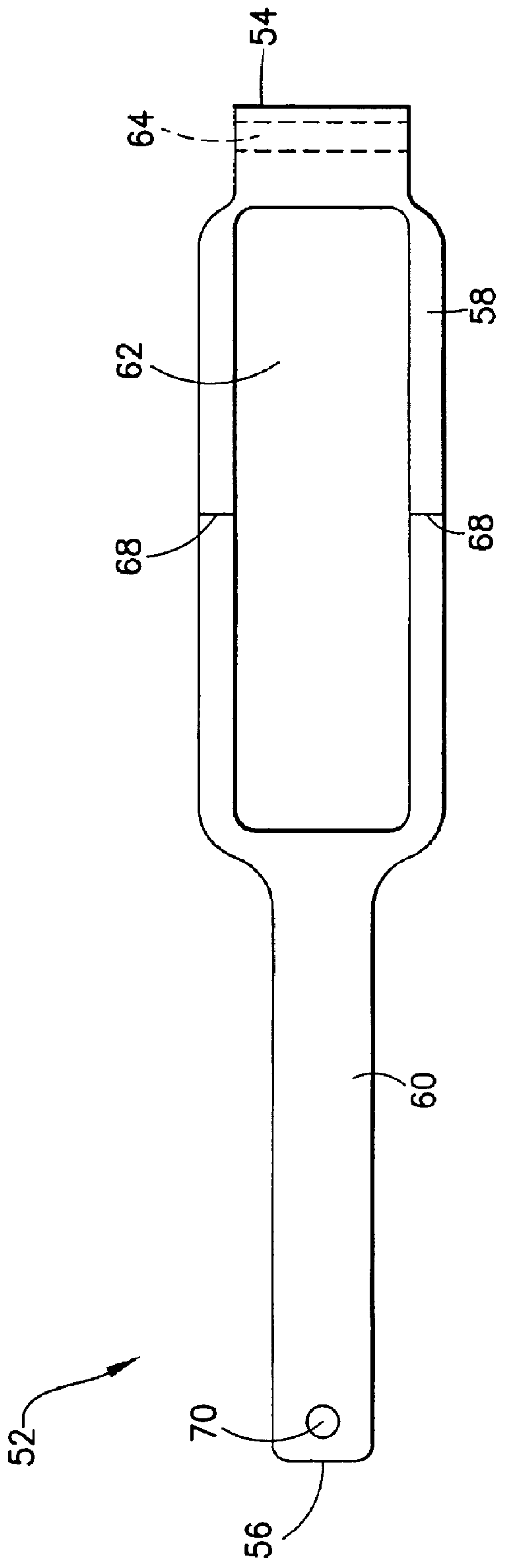
FIG. 6 is an elevational top side view (relative to a first section of the spanner plate) of the spanner plate shown in FIG. 3.

Referring now also to FIG. 2, the crimping tool 10 further comprises a toggle mechanism 32 and a cam mechanism 34 disposed within the frame. The toggle mechanism 32 is connected to the first end 24 of the frame 12 and comprises a plurality of links 36, 38, pivot pins 40, and other supporting hardware. The toggle mechanism 32 pivotably connects the first jaw 14 and the second jaw 16 to each other and to the frame 12. The cam mechanism 34, comprising a cam member 42 and other supporting hardware, is supported within the frame 12, by a pin 44 for example, between the first end 24 and the second end 30 of the frame 12. The cam member 42 is in contact with a cam follower 46 which is pivotally connected to, and forms a portion of, the toggle mechanism 32.

The cam member 42 is rotated by any suitable mechanism such as a ratchet mechanism comprising a ratchet wheel 48 and pawl 50 driven by multiple strokes of the second handle 20. As the cam member 42 rotates, a force is exerted by the cam member 42 on the cam follower 46 to actuate the toggle mechanism 32 and the crimping jaws 14, 16. An increasing radius of the cam member 42 builds up the force to a maximum crimping force exerted by the cam member 42. When the cam member 42 rotates from its lowest radius to its highest radius, the jaws 14, 16 are in a closed or crimping position. When the cam member 42 rotates from its highest radius to its lowest radius, the jaws 14, 16 are in an open position. The cam member 42 may comprise a shape allowing for a rapid or sudden release of the crimping force as the cam member 42 rotates from its highest radius to its lowest radius (end of crimping cycle).

The crimping tool 10 also comprises a spanner plate 52 (best illustrated in FIGS. 3-6). The spanner plate 52 is disposed within the frame such that the spanner plate 52 surrounds the cam member 42. Additionally, a first end 54 of the spanner plate 52 is connected to the toggle mechanism 32 and a second end 56 of the spanner plate 52 is connected to the first handle 18. The spanner plate 52 may be fabricated from any suitable material, such as stainless steel (304) or cold roll steel, hardened to Rc (Rockwell C-scale hardness number) about 50 to about 55, for example. The spanner plate 52 is configured to create an audible and tactile "pop" at the end of the crimping cycle in the crimping tool 10.

The spanner plate 52 comprises a first section 58 and a second section 60. The first section 58 comprises an aperture 62 suitably sized and shaped to fit around the cam member 42 and cam mechanism 34 (as well as other crimping tool 10 components) with a clearance gap therebetween. The aperture 62 extends along a majority of the length of the first section 58. The aperture 62 may comprise a generally rectangular shape which provides a sufficient clearance envelope around the cam member 42 and the cam mechanism 34 such as to not interfere with the operation of the crimping tool 10.

The first section 58 also comprises an opening 64 extending through a width of the first section 58 proximate the first end 54. The first end 54 is suitably sized and shaped to be fitted, or sandwiched, between two links 36 (shown in FIG. 2) of the toggle mechanism 32. The opening 64 is suitably sized and shaped to receive a pin 66 (shown in FIG. 2) of the toggle mechanism 32. The opening 64 extends through the first section 58 in a generally substantially perpendicular orientation to the aperture 62. The opening 64 is aligned with pin holes 67 of the links 36. This allows for the pin 66 to extend through the opening 64 with ends of the pin fitted within the pin holes 67. The opening 64 allows for the first end 54 of the spanner plate 52 to be pivotably attached to the links 36 (through pin 66) of the toggle mechanism 32 connected to the second jaw 16.

The first section 58 may comprise a bend 68 along a middle portion of the first section 58. When viewed from the side (best shown in FIG. 4), the bend 68 forms a generally obtuse angle between portions of the first section 58 extending away from the bend 68. The bend 68 is provided at lateral sides of the aperture 62 forming a general "V" shape at the edge of the aperture 62. It should be noted that in alternate embodiments, the bend 68 may be provided at any suitable location along the spanner plate 52.

The second section 60 extends from the first section 58 in a general cantilevered fashion. The second section 60 comprises an elongated generally rectangular shape with an opening 70 proximate the second end 56. The opening 70 is suitably sized and shaped to receive an end of a resilient member, such as an extension spring 72 (shown in FIG. 2) for example. The opening 70 allows for the second end 56 of the spanner plate 52 to be coupled to the first handle 18 through the spring 72. The opening 70 proximate the second end 56 is substantially perpendicular to the opening 64 proximate the first end 54. The spring 72 may be connected to an end of the handle by a pin 74 (shown in FIG. 2) for example.

It should be noted that although the figures illustrate the spanner plate 52 as being connected to the tool 10 by the pin 66 at the first end 54 and the spring 72 at the second end 56, the reverse configuration may be provided wherein a spring is connected to the first end 54 and a pin is connected to the second end 56. Additionally, any combination of springs and/or pins may be provided. Furthermore, alternate embodiments may comprise any other suitable methods of connecting the spanner plate 52 to the tool 10.

The spanner plate 52 transfers a spring force from the end of the tool handle 18, around the cam mechanism 34 to the moveable second jaw, or indentor jaw, 16. As the tool 10 is cycled, a pulling force is transferred through the spanner plate 52, stretching the extension spring 72. At the end of the tool's 10 cycle (rotation of the cam member 42 from its highest radius to its lowest radius) the tension is suddenly released, allowing the indentor jaw 16 to fully retract and open (under the force from the extension spring 72) until a back side 76 (shown in FIG. 2) of the indentor jaw 16 impacts a stop feature of the tool 10. The stop feature may be an end 78 of the second handle 20 for example. However, it should be noted that alternate embodiments may provide any suitable location for the stop feature. Additionally, it should be noted that alternate embodiments may provide for either or both of the jaws 14, 16 to impact the housing 22, the frame 12, or any other suitable portion of the tool 10. The impact of the indentor jaw 16 on the stop feature creates the audible and tactile "pop".

The spanner plate 52 provides for an improved crimping tool 10 which gives the user/operator indications that the crimping cycle has been completed. The audible and tactile "pop" allows users to quickly perform crimps on electrical connectors in various environments. The "pop" provides an audible indication of a completed crimp (or a completed tool operation) which can be heard in most industrial environments and maintenance locations. Additionally, the impact also provides a tactile indication which the user can feel at the handles 18, 20. The tactile indication is useful in industrial environments and maintenance locations having increased levels of background noise (where the audible "pop" cannot be heard). The "pop" provides users with an indication that a successful crimp operation has been performed and that the tool 10 has not malfunctioned.

The disclosed spanner plate 52 provides further advantages over conventional configurations by allowing a high spring force to be applied to the indenter jaw 16 towards the open position. This creates a significant "snap" that is both audible and tactile at the end of a completed crimp cycle. The absence of a spanner plate does not allow a large force to be applied to the indenter jaw 16 which therefore gives very little indication of a completed crimp. The general opinion of a person operating a tool that has a spanner plate equipped tool is that the audible and tactile "snap" is an appealing signal that the crimp has been completed. The high spring force that the spanner plate 52 applies to the indenter jaw 16 effectively sets the cam 42 in the tool 10 to the same location at the end of each cycle. This ensures that the jaw opening will be consistent between cycles and that the same number of handle strokes will be required for each crimp cycle.

It should be noted that although the figures illustrate the disclosed spanner plate 52 as a component within a crimp connector 10, which may be a Type OH25 HYTOOL™ sold by FCI USA, Inc. (under the FCI-BURNDY® Products line) for example, alternate embodiments may provide the spanner plate 52 within any tool having movable jaws.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector tool spanner plate comprising:

a first section comprising an aperture and a first opening, wherein the aperture extends along a majority of a length of the first section, wherein the first opening is substantially perpendicular to the aperture, and wherein the spanner plate is configured to surround an electrical connector tool cam mechanism at the aperture; and a second section comprising a second opening, wherein the second section extends from the first section in a general cantilevered fashion, wherein the second opening is proximate a free end of the second section, and wherein the aperture is between the first opening and the second opening.

2. The electrical connector tool spanner plate of claim 1 wherein the aperture comprises a generally rectangular shape, and wherein the generally rectangular shape is configured to provide a sufficient clearance envelope around a cam member of the cam mechanism.

3. The electrical connector tool spanner plate of claim 1 wherein the second opening is substantially perpendicular to the first opening.

4. The electrical connector tool spanner plate of claim 1 wherein the first section comprises a bend along a middle portion of the first section.

5. The electrical connector tool spanner plate of claim 1 wherein the aperture comprises a generally rectangular shape, wherein the generally rectangular shape is configured to provide a sufficient clearance envelope around a cam member of the cam mechanism, and wherein the second opening is substantially perpendicular to the first opening.

6. The electrical connector tool spanner plate of claim 5 wherein the first section comprises a bend along a middle portion of the first section.

7. The electrical connector tool spanner plate of claim 6 wherein the bend is provided at lateral sides of the aperture, and wherein the bend forms a general "V" shape at an edge of the aperture.

8. The electrical connector tool spanner plate of claim 1 wherein the spanner plate comprises steel.

9. The electrical connector tool spanner plate of claim 1 wherein the spanner plate comprises a Rockwell C-scale hardness number between about 50 to about 55.

10. An electrical connector tool comprising:

a frame comprising a first end and a second end;

a jaw connected to the first end of the frame;

a handle extending from the second end of the frame; and an electrical connector tool spanner plate as in claim 1 connected between the jaw and the handle.

11. An electrical connector tool comprising:

a frame comprising a first end and a second end;

a jaw connected to the first end of frame;

first handle extending from the second end of the frame;

a spanner plate comprising a first end and a second end, wherein the first end is connected to the jaw, and wherein the spanner plate is configured to transfer a force between the first handle and the jaw;

a cam member between the first end and the second end of the spanner plate, wherein the cam member is supported within the frame; and a resilient member connected between the first handle and the second end of the spanner plate.

12. The electrical connector tool of claim 11 wherein a user is signaled of an occurrence of a completed tool operation when the force is transferred between the first handle and the jaw.

13. The electrical connector tool of claim 11 wherein the resilient member comprises a spring, and wherein the force comprises a spring force.

14. The electrical connector tool of claim 11 wherein the tool is configured to provide a user with an audible indication of an occurrence of a completed tool operation when the force is transferred between the first handle and the jaw.

15. The electrical connector tool of claim 11 wherein the tool is configured to provide a user with a tactile indication of an occurrence of a completed tool operation when the force is transferred between the first handle and the jaw.

16. The electrical connector tool of claim 11 wherein the jaw is movably connected to the first end of the frame, and wherein the jaw is configured to impact a portion of the tool when the force is transferred between the first handle and the jaw.

17. The electrical connector tool of claim 11 further comprising a second handle pivotably connected between the first end and the second end of the frame, and wherein a tactile indication is provided at the first handle and the second handle when the force is transferred between the first handle and the jaw.

18. The electrical connector tool of claim 11 wherein the spanner plate further comprises an aperture, and wherein the cam member is fitted within the aperture.

19. The electrical connector tool of claim 11 wherein the spanner plate further comprises a bend portion, and wherein the bend portion forms a generally obtuse angle between portions of the spanner plate extending away from bend portion.

20. The electrical connector tool of claim 11 further comprising a toggle mechanism connected to between the jaw and the frame, and wherein the spanner plate is pivotably connected to the toggle mechanism.

21. The electrical connector tool of claim 20 wherein an end of the spanner plate is between links of the toggle mechanism.

22. The electrical connector tool of claim 11 wherein an end of the spanner plate further comprises an opening, and wherein the opening is sized and shaped to receive an end of the resilient member.

23. A method of manufacturing an electrical connector tool comprising:

providing a frame comprising a first end and a second end, wherein the frame comprises a first handle extending from the second end of the frame;

movably connecting a jaw to the first end of the frame;

supporting a spanner plate within the frame, wherein the spanner plate comprises a first end and a second end, wherein the first end is connected to the jaw, and wherein the spanner plate is configured to transfer a force between the first handle and the jaw;

connecting a cam member to the frame, wherein the cam member is between the first end and the second end of the spanner plate; and connecting a resilient member between the first handle and the second end of the spanner plate.

24. The method of claim 23 wherein the connecting of the resilient member between the first handle and the second end of the spanner plate further comprises connecting a spring between the first handle and the second end of the spanner plate.

* * * * *